Jan. 5, 1943. W. L. McCASLIN 2,307,227
CREAM TREATMENT
Filed March 20, 1939
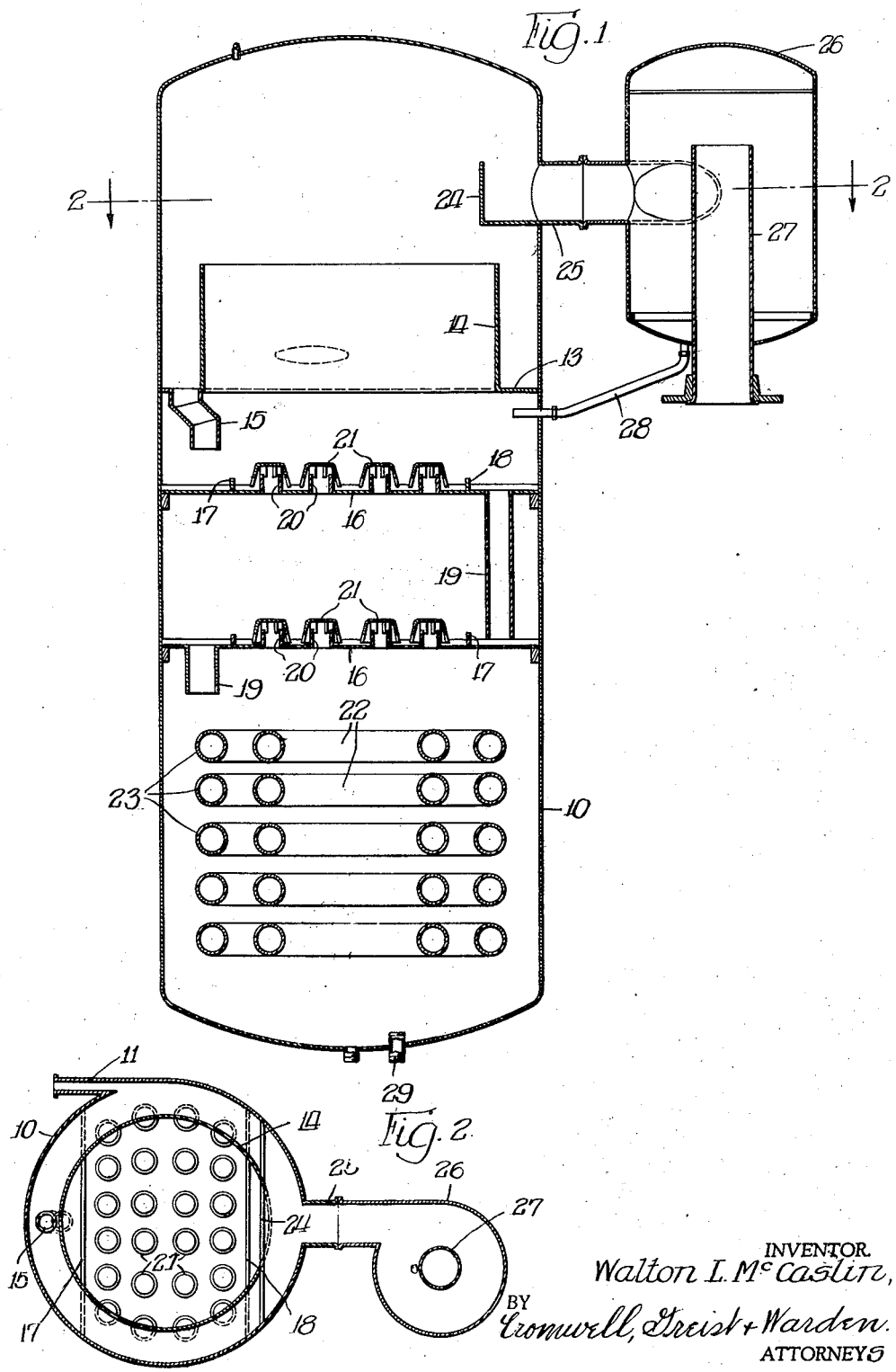
INVENTOR.
Walton L. McCaslin,
BY Cromwell, Greist + Warden.
ATTORNEYS Patented Jan. 5, 1943

2,307,227

UNITED STATES PATENT OFFICE 2,307,227

CREAM TREATMENT

Walton L. McCaslin, Chicago, Ill., assignor to Armour and Company, Chicago, Ill., a corporation of Illinois Application March 20, 1939, Serial No. 263,052

3 Claims. (Cl. 99—61)

The present invention relates to the treatment of dairy products and has particular reference to an improved process and apparatus for the deodorization and purification of cream.

Dairy cream has the characteristic of developing and acquiring odors which render the material unpalatable. A great deal of effort has been expended in endeavors to develop a satisfactory process for deodorization of cream. Various aeration methods have been tried. Other methods include blowing steam through the material to be deodorized. A principal object of the present invention is the provision of a method for deodorizing cream which has proved to be more satisfactory than the previously known systems of treatment, the improved method involving an economy of operation and at the same time providing for an effective disruption of the absorptive bond between the objectionable odoriferous substances and the cream solids and separation of such substances.

An additional object is the deodorization of cream by passing a stream of the material downwardly through a series of zones countercurrent to upwardly rising steam generated in situ in a body of the cream adjacent the lower of the zones, the temperature of the cream being increased to its boiling point under the conditions of the process partially by the upwardly rising steam and partially by additional heat supplied as at the base of the zones.

A further object is the deodorization of cream by passing it downwardly through a bubble plate tower maintained under reduced pressure, boiling the cream in the lower portion of the tower, and passing the steam generated from the cream upwardly through the bubble tower countercurrent to the downwardly flowing stream of cream, this treatment being effective to remove undesirable odors from the cream and to render it sterile without other treatment.

These and other objects will be apparent upon consideration of the following description of a preferred embodiment of the invention and by references to the accompanying drawing, in which Fig. 1 is a vertical sectional view of apparatus suitable for carrying out the process; and Fig. 2 is a sectional view taken along line 2—2 of Fig. 1.

The solids content of cream, which may constitute about 15 per cent of the cream, has a peculiar affinity for many odor and taste-imparting substances. Certain of the odorous materials may be acquired from outside sources as by absorption, while others may be the result of chemical decomposition of the cream itself. In either case the undesirable products are tenaciously held by the cream and persist to such an extent as materially to reduce the value of the product.

In the drawing, the tower or column 10 has provided adjacent its upper portion a tangential inlet 11 through which cream to be deodorized and purified is introduced. The cream is received in and passes through a channel formed by the plate 13 and an upwardly extending open-ended cylinder 14.

After passing around the cylinder 14 the cream is conducted through the offset down spout 15 to a bubble tray 16. The inlet portion of the bubble tray is formed by the weir 17. Cream spilling over the weir 17 passes horizontally across the bubble plate and after spilling over the outlet weir 18 passes through the down spout 19 to another bubble tray similar to the tray 16. The down spout 19 conducts the cream from the upper bubble tray to the inlet portion of the lower bubble tray. While only two bubble trays have been disclosed, it will be understood that a greater number may be and generally are used, two being indicated for the purpose of simplicity.

The bubble trays 16 also are provided with upwardly extending vapor vents 20 which are covered by the serrated edge bubble caps 21.

In the lower portion of the column 10 below the lower bubble tray there is provided a relatively large space constituting a primary heating zone. Within this zone are contained the closed steam coils 22 and 23 through which steam is passed to raise the temperature of cream in the lower portion of the column to the desired extent.

Adjacent the upper portion of the column 10 and above the open cylinder 14 there is provided a tray 24, the upper portion of which opens to a vapor outlet conduit 25. This conduit 25 passes tangentially into an entrainment separator 26.

The separator 26 consists of a vertical drum having an upwardly extending open conduit 27 leading out of the bottom of the separator to a condenser and source of vacuum (not shown).

From the bottom of the entrainment separator 26 a line 28 extends to within the column 10 for return of liquid separated from the vapors in the drum.

In the operation of the mechanism described, cream to be deodorized is passed through the conduit 11 into the circular channel provided by the open cylinder 14. As the cream passes around this cylinder it is subjected to the action of the vacuum within the tower and there results a removal of occluded gases and a certain amount of the volatile impurities of the cream, together with more or less water vapor.

An important effect of the removal of occluded gases is the elimination of oxygen from the cream, thereby preventing damage to the cream by this element in the heating zone.

The cream then passes down through the offset pipe 15 and horizontally across the upper bubble tray 16. From the upper bubble tray the cream passes downwardly to the lower bubble tray and horizontally thereacross. Finally, the cream passes downwardly into the heating zone in the bottom of the tower 10.

The closed steam coils 23 maintain the cream in the bottom of the column at a temperature sufficiently high to boil it and to form substantial quantities of steam. Due to the relatively high vacuum maintained in the column this steam flows upwardly through the bubble trays and out the conduit 25. In passing through the bubble trays the steam acts as a scrubbing agent with respect to the liquid cream passing across the bubble trays. The scrubbing action of the steam effectively removes a large percentage of the objectionable odor and taste-imparting constituents of the cream.

It will be noted that there is maintained in the bottom of the tower a relatively large volume of cream undergoing the boiling operation. This volume may be controlled by withdrawal of cream through the bottom outlet 29.

The action of the deodorizer in generating steam directly from the cream itself is quite different in effect from the processes known heretofore in which steam from an outside source was passed upwardly through the cream. The generation in situ of the steam seems to enhance the volatilization of odor and taste-imparting constituents remaining in the cream after it passes through the lower bubble tray. The operating conditions also inhibit coagulation of the protein content of the cream. While the temperature in the heating zone may be of the order of 180° F. and the retention time about five minutes, there is little tendency for the decomposition of the cream proteins. The vacuum in the tower is maintained at least as high as twenty inches and preferably more than twenty-five inches. The temperature of the cream will depend upon the pressure and normally will be between 140° F., and 185° F. The holding time of the cream in the boiling zone will depend upon such factors as the temperature and the state of contamination.

As the cream enters the tower through the inlet 11 it may be at room temperature but preferably is at an elevated temperature below the point a which there is a thermal breakdown of cream proteins. The steam passing upwardly through the bubble trays is effective to raise the temperature of the cream substantially before the cream reaches the primary heating zone in the bottom of the tower. If desired, the cream may be preheated. The boiling in the bottom of the tower and the scrubbing action of the resulting steam as it passes upwardly countercurrent to the downwardly flowing cream is effective to produce a thorough deodorization of the cream. Further, the temperature and time element involved in the treatment in the lower portion of the tower effectively sterilize the cream by destroying organisms of animal and vegetable origin.

It will be noted that the bubble trays cover substantially the entire cross-sectional area of the chamber and that as the cream passes horizontally across these trays it is brought into intimate contact with vapors passing upwardly from the lower portion of the chamber. This results in a relatively large area of cream being exposed to the low vacuum and scrubbing action of steam for a relatively long period of time, thereby raising the temperature of the cream and effectively reducing the content of taste and odor-imparting constituents. As before stated, any number of bubble trays may be employed. Rascheg rings or other suitable types of vapor-liquid contact devices also may be used if desired.

In the bottom of the column the cream is heated sufficiently to cause violent boiling, since it is this generation of steam in situ in the cream that effects removal of odoriferous materials to an extent not possible heretofore in a practical manner. Introduction of steam from extraneous sources does not interfere with the action of the generated steam but is unnecessary and in many cases undesirable.

Under certain conditions it will be found desirable to recirculate cream from the bottom of the deodorizing chamber to the upper tray. The recirculated cream is admixed with incoming material so as to produce a quick rise in the temperature of the material. Other suitable methods of heating the incoming material prior to introduction into the scrubbing tower also may be employed.

The flow of steam through the cream on the bubble trays causes the steam to pick up particles of cream and to carry these particles off through the vapor outlet. In the entrainment remover 26 the steam containing particles of cream whirl around so as to cause the particles of cream to be removed and to flow downwardly and back into the tower through the line 28. The steam, freed from particles of cream, then passes out of the entrainment remover through the conduit 27.

It will be understood that the operating factors of the process will vary, depending upon the particular nature of the cream being treated. This will include the holding time in the bottom of the tower as well as such factors as the temperature and amount of steam produced. Of course, the temperature will depend directly upon the pressure within the tower, since the cream is maintained at its boiling point. Preferably, a relatively high vacuum is employed. The generation of steam from the cream itself results in an increase in the percentage of solids in the cream. This concentration is not objectionable and in many cases even may be desirable. Some creams may be contaminated with odoriferous or taste-imparting constituents which are more difficult to remove than others, thereby requiring relatively longer time of treatment than in the case of the less impure cream.

The various changes which may be made in the method and apparatus without departing from the scope of the invention are intended to be included in the appended claims.

I claim:

1. The process which comprises passing cream downwardly through a series of heat exchange zones and into a heated zone, boiling the cream in the heated zone, and passing the steam generated from said cream upwardly through said zones in contact with and countercurrent to the flow of said cream therethrough.

2. The process which comprises maintaining a downwardly extending series of heat exchange zones and a boiling zone under reduced pressure, boiling cream in said boiling zone sufficiently to generate a substantial quantity of steam therefrom, passing cream at a relatively low initial temperature downwardly through said heat exchange zones and into said boiling zone, passing the steam generated in said boiling zone upwardly through said heat exchange zone in contact with and countercurrent to the flow of cream therethrough, and withdrawing steam from above said heat exchange zones.

3. The process which comprises maintaining a downwardly extending series of vapor contact zones under reduced pressure, passing cream downwardly through said zones and into a heating zone, boiling the cream in said heating zone to generate a substantial quantity of steam therefrom, passing the steam generated from said cream upwardly through said vapor contact zones countercurrent to and in contact with said cream, and withdrawing vapors from above said vapor contact zones.

WALTON L. McCASLIN.